US009812083B2

(12) United States Patent
Yen et al.

(10) Patent No.: US 9,812,083 B2
(45) Date of Patent: Nov. 7, 2017

(54) DISPLAY DEVICE

(71) Applicant: AU Optronics Corporation, Hsin-Chu (TW)

(72) Inventors: Shao-Wen Yen, Hsin-Chu (TW); Tsung-Shiun Lee, Hsin-Chu (TW); Yi-Cheng Liu, Hsin-Chu (TW); Sheng-Yu Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 544 days.

(21) Appl. No.: 14/514,834

(22) Filed: Oct. 15, 2014

(65) Prior Publication Data

US 2015/0339998 A1 Nov. 26, 2015

(30) Foreign Application Priority Data

May 23, 2014 (TW) ............................. 103118123 A

(51) Int. Cl.

| | |
|---|---|
| ***G06F 1/00*** | (2006.01) |
| ***G09G 3/36*** | (2006.01) |
| ***G09G 3/20*** | (2006.01) |
| ***G09G 3/32*** | (2016.01) |

(52) U.S. Cl.

CPC ......... *G09G 3/3674* (2013.01); *G09G 3/2088* (2013.01); *G09G 3/32* (2013.01); *G09G 2300/08* (2013.01); *G09G 2310/0286* (2013.01)

(58) Field of Classification Search

CPC ............. G09G 3/3674; G09G 2300/08; G09G 2310/0286; G06F 3/041

See application file for complete search history.

(56) References Cited

U.S. PATENT DOCUMENTS

| | | | | |
|---|---|---|---|---|
| 7,169,652 | B2 | 1/2007 | Kimura et al. | |
| 7,834,359 | B2 | 11/2010 | Kimura et al. | |
| 8,508,111 | B1 | 8/2013 | Xi et al. | |
| 8,619,008 | B2 | 12/2013 | Cok et al. | |
| 2008/0001545 | A1* | 1/2008 | Uchino ................ | G09G 3/3233 315/175 |
| 2013/0194196 | A1* | 8/2013 | Lai ........................ | G06F 3/0412 345/173 |

(Continued)

FOREIGN PATENT DOCUMENTS

| | | |
|---|---|---|
| CN | 102360539 | 2/2012 |
| CN | 102983132 | 3/2013 |
| TW | 201400958 A | 1/2014 |

(Continued)

*Primary Examiner* — Michael Faragalla

(74) *Attorney, Agent, or Firm* — WPAT, PC

(57) ABSTRACT

A display device includes a substrate, display units, and a plurality of integrated circuits (ICs). The substrate includes an active area and a non-active area. The non-active area is located around the active area. The display units are disposed in the active area of the substrate, and arranged in a matrix. The ICs are disposed in the active area of the substrate, arranged in a matrix, and are electrically coupled to the display units. Each of the ICs includes a shift register unit. Each of the shift register units of the ICs is configured to receive a previous-stage scan signal, and generate a current-stage scan signal according to the previous-stage scan signal. The ICs drive the display units according to the current-stage scan signals.

15 Claims, 10 Drawing Sheets

(56) References Cited

U.S. PATENT DOCUMENTS

| | | | | |
|---|---|---|---|---|
| 2014/0084284 | A1* | 3/2014 | Nakano | H01L 29/7869 257/43 |
| 2014/0085560 | A1* | 3/2014 | Sung | G02F 1/13306 349/43 |

FOREIGN PATENT DOCUMENTS

| | | | |
|---|---|---|---|
| TW | 201413352 | A | 4/2014 |
| TW | 201413974 | A | 4/2014 |

* cited by examiner

DISPLAY DEVICE

RELATED APPLICATIONS

This application claims priority to Taiwan Application Serial Number 103118123, filed May 23, 2014, which is herein incorporated by reference.

BACKGROUND

Field of Invention

The present disclosure relates to an electronic device. More particularly, the present disclosure relates to a display device.

Description of Related Art

With advances in electronic technology, display panels are widely used in our daily lives, such as being used in mobile phones and computers.

A typical light emitting diode display includes a scan circuit, a data circuit, and a pixel array of pixels. The scan circuit can sequentially generate a plurality of scan signals, and provide the scan signals to the pixels, so as to sequentially turn on switching transistors in the pixels. The data circuit can generate a plurality of data signals and provide the data signals to the pixels via the switching transistors which turn on. With such operation, the pixels receiving the data signals may be used to refresh/display an image.

A typical scan circuit is disposed in a non-active area around the pixels, and provides the scan signals to the pixels disposed in an active area. However, with such a configuration, a sufficient space is required for the non-active area to accommodate the scan circuit, and it is therefore not possible to further shrink the edges of the display device.

Thus, an area of research in this field involves ways in which to overcome such a problem.

SUMMARY

One aspect of the present disclosure is related to a display device. In accordance with one embodiment of the present disclosure, the display device includes a substrate, display units, and a plurality of integrated circuits (ICs). The substrate includes an active area and a non-active area. The non-active area is located around the active area. The display units are disposed in the active area of the substrate, and arranged in a matrix. The ICs are disposed in the active area of the substrate, arranged in a matrix, and are electrically coupled to the display units. Each of the ICs includes a shift register unit. Each of the shift register units of the ICs is configured to receive a previous-stage scan signal, and generate a current-stage scan signal according to the previous-stage scan signal. The ICs drive the display units according to the current-stage scan signals.

Another aspect of the present disclosure is related to a display device. In accordance with one embodiment of the present disclosure, the display device includes a substrate, display units, a plurality of bonding pad sets, and a plurality of integrated circuits. The substrate includes an active area and a non-active area. The non-active area is located around the active area. The display units are disposed in the active area of the substrate, and arranged in a matrix. The bonding pad sets are disposed on the active area of the substrate, arranged in a matrix, and electrically coupled to each other. Each of the bonding pad sets includes a bonding pad electrically coupled to at least one of the display units among the plurality of display units. The ICs are respectively bonded on the bonding pad sets and arranged in a matrix on the active area of the substrate. A row of the ICs are configured to provide a plurality of scan signals to another row of the ICs via the bonding pad sets.

DETAILED DESCRIPTION

Figure 1:
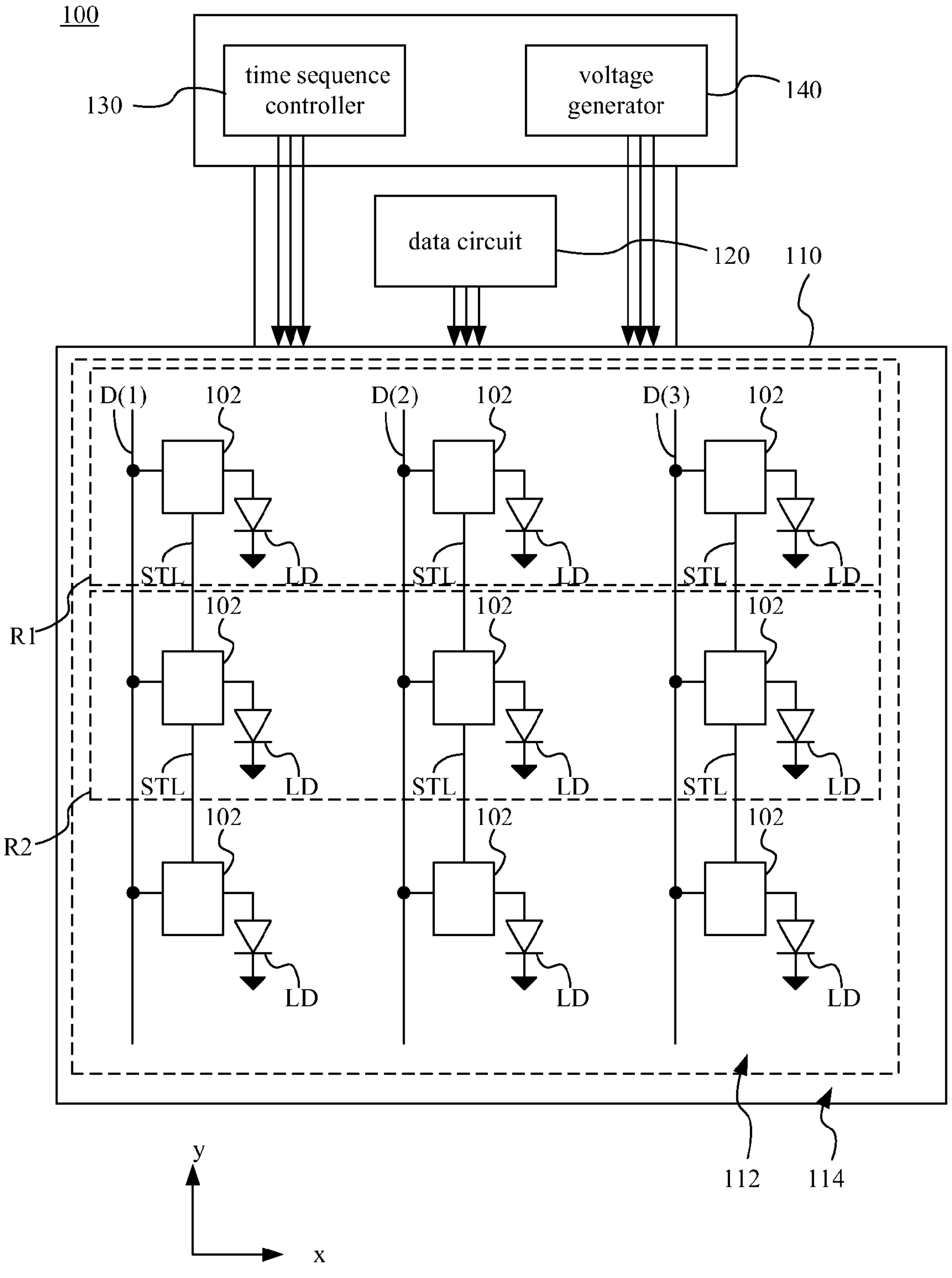
FIG. 1 is a schematic diagram of a display device according to one embodiment of the present disclosure.
Figure 2A:
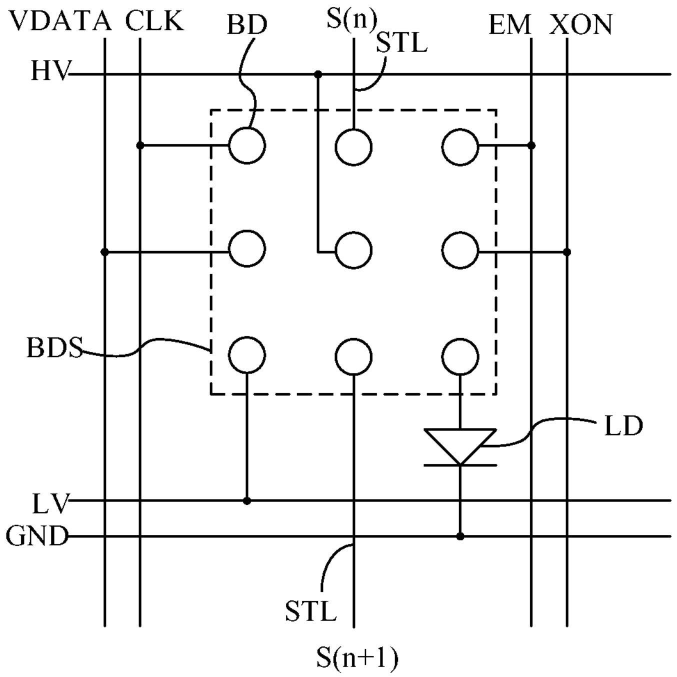
FIG. 2A illustrates connections of a bonding pad set according to one embodiment of the present disclosure.
Figure 2B:
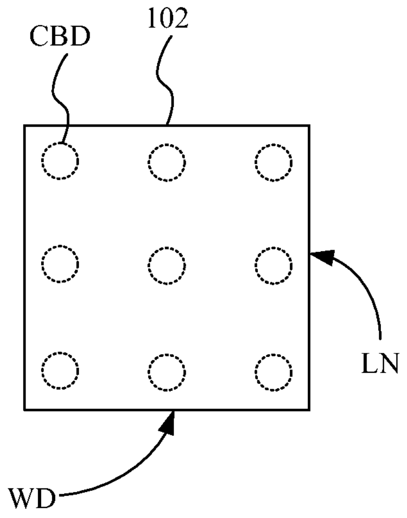
FIG. 2B illustrates bonding points of an IC according to one embodiment of the present disclosure.
Figure 2C:
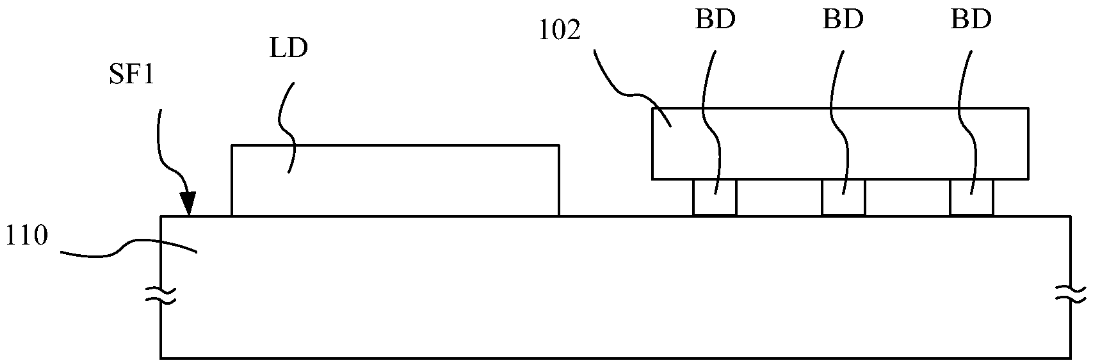
FIG. 2C illustrates dispositions of an IC and a display unit on a substrate according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements are not limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically coupled" to another element, it can be directly connected or coupled to the other element or intervening elements may be present. In contrast, when an element is referred to as being "directly connected" to another element, there are no intervening elements present. Moreover, "connect" or "electrically connect" can further refer to the interoperation or interaction between two or more elements.

It will be understood that, in the description herein and throughout the claims that follow, the phrase "and/or" includes any and all combinations of one or more of the associated listed items.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the meaning of "a," "an," and "the" includes reference to the plural unless the context clearly dictates otherwise.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, are interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a display device. To simplify the description below, an active matrix organic light emitting diode (AMOLED) display device is taken as an example, but the present disclosure is not limited in this regard. Another display device (e.g., a liquid crystal display device or a micro-LED display device) is within the contemplated scope of the present disclosure.

One embodiment of the present disclosure is described in the paragraphs below with reference to FIGS. 1, 2A, 2B, and 2C.

In this embodiment, the display device 100 may include a substrate 110, a data circuit 120, a time sequence controller 130, a voltage generator 140, ICs 102, data lines D(1)-D(3), scan signal transmission lines STL, display units LD and bonding pad sets BDS. It is noted that the numbers of the elements described herein are given for illustrative purposes, and such numbers are not limited to this embodiment.

In this embodiment, the substrate 110 includes an active area 112 and a non-active area 114. The non-active area 114 is located around the active area 112. In one embodiment, the substrate 110 can be a rigid substrate or a flexible substrate.

In this embodiment, the bonding pad sets BDS are disposed in the active area 112 and arranged in a matrix. In one embodiment, each of the bonding pad sets BDS includes 9 bonding pads BD, but the disclosure is not limited in this regard. In different embodiments, the numbers of the bonding pads BD can be varied on the basis of actual requirements. In one embodiment, the bonding pads BD are realized by using conductive material.

In this embodiment, the display units LD are disposed in the active area 112 and arranged in a matrix. In one embodiment, the display units LD are disposed on a surface SF1 of the substrate 110.

In this embodiment, each of the display units LD is electrically coupled to one of the bonding pad sets BDS. That is, one of the bonding pads BD of each of the bonding pad sets BDS is electrically coupled to one (or at least one) of the display units LD.

In this embodiment, the display units LD may be light emitting components, such as light emitting diodes (LEDs) or organic light emitting diodes (OLED), but the present disclosure is not limited in this regard. In one embodiment, anode ends of the display units LD are electrically coupled to the bonding pad sets BDS, and cathode ends of the display units LD are configured to receive a grounding voltage level GND. In some different embodiments, the display units LD may include pixel electrodes and liquid crystal components.

In this embodiment, the ICs 102 are disposed in the active area 112 and arranged in a matrix. The ICs 102 may include a plurality of bonding points CBD. The ICs 102 may be bonded on the bonding pad sets BDS via the bonding points CBD. In one embodiment, the ICs 102 are disposed on the surface SF1 of the substrate 110. That is, the ICs 102 and the display units LD are disposed on the same surface SF1 of the substrate 110. In this embodiment, each of the ICs 102 is electrically coupled to one (or at least one) of the display units LD via one of the bonding pads BD, so as to drive the corresponding display unit(s) LD. In one embodiment, one of the ICs 102 is configured to drive a red driving unit LD, a blue driving unit LD, or a green driving unit LD, so as to enable an image of a sub-pixel to be displayed.

In this embodiment, the data lines D(1)-D(3) are disposed on the substrate 110. The data lines D(1)-D(3) are parallel to each other, and each of the data lines D(1)-D(3) is electrically coupled to a column of the bonding pad sets BDS. That is, each one of the bonding pad sets BDS of a column of the bonding pad sets BDS has a bonding pad BD therein electrically coupled to the same one of the data lines D(1)-D(3). In another aspect, each column of the ICs 102 (e.g., the ICs 102 arranged along the y-axis) are electrically coupled to the same one of the data lines D(1)-D(3) via the bonding pads BD.

In this embodiment, the scan signal transmission lines STL are disposed on the substrate 110, and electrically coupled between two adjacent bonding pad sets BDS. In one embodiment, one end of one of the scan signal transmission lines STL is electrically coupled to a bonding pad BD of a first bonding pad set BDS. Another end of the scan signal transmission line STL is electrically coupled to a bonding pad BD of a second bonding pad set BDS. The first and second bonding pad sets BDS are adjacent to each other, and are arranged along the y-axis. That is, the scan signal transmission lines STL are connected between two adjacent bonding pad sets BDS which are arranged along the y-axis.

In this embodiment, the data circuit 120 is electrically coupled to the ICs 102 on the substrate 110, and is configured to provide data signals VDATA to the ICs 102 via the data lines D(1)-D(3) and the bonding pad sets BDS.

In this embodiment, the time sequence controller 130 is electrically coupled to the ICs 102 on the substrate 110, and is configured to provide several operating signals (e.g., a clock signal CLK, an emitting signal EM, an interrupt signal XON, and a compensation signal CMP) to the ICs 102 via the bonding pad sets BDS.

In this embodiment, the voltage generator 140 is electrically coupled to the ICs 102 on the substrate 110, and is configured to provide several voltage levels (e.g., a ground voltage level GND, and supply voltage levels HV, LV) to the ICs 102 via the bonding pad sets BDS.

Figure 3:
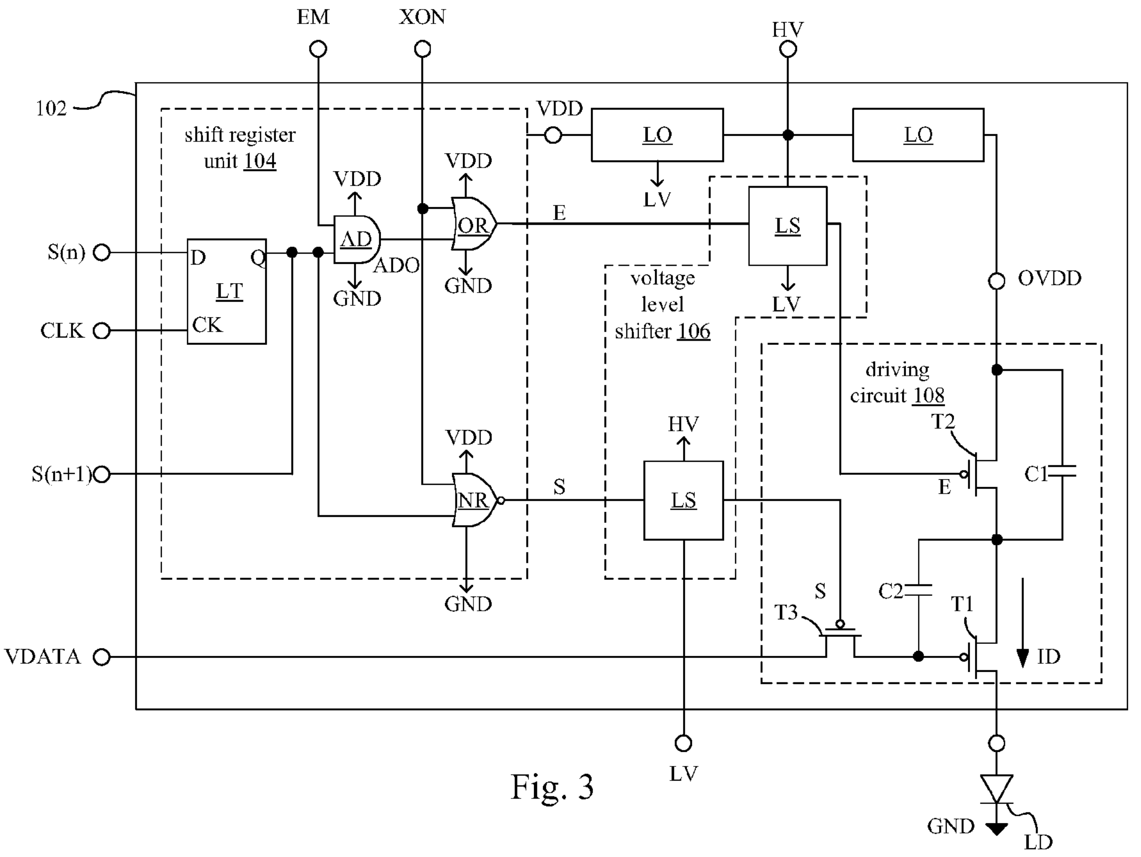
FIG. 3 is a schematic diagram of an IC according to one embodiment of the present disclosure.

In one embodiment, each of the ICs 102 includes a shift register unit 104 (see FIG. 3). The shift register unit 104 is configured to receive a previous-stage scan signal (e.g., a scan signal S(n)), and generate a current-stage scan signal (e.g., a scan signal S(n+1)) according to the previous-stage scan signal. The ICs 102 can drive the display units LD according to the current-stage scan signal.

In one embodiment, each row of the ICs 102 (e.g., the ICs 102 arranged along the x-axis) can provide the current-stage scan signals to an immediately adjacent row of the ICs 102, to serve as the previous-stage scan signals of the immediately adjacent row of the ICs 102.

For example, a first row of the ICs 102 (denoted as group R1) can provide the current-stage scan signals to the adjacent second row of the ICs 102 (denoted as group R2), to serve as the previous-stage scan signals of the second row of the ICs 102.

Through the configuration described above, a scan circuit can be integrated into the ICs 102. In such a manner, the non-active area 114 can be significantly shrunk since it is not necessary to dispose the scan circuit therein.

In addition, in some approaches, the driving circuit configured to drive the display units LD are fabricated by thin-film transistors (TFT).

However, in one embodiment of the present disclosure, the ICs 102 can be manufactured by a silicon semiconductor manufacturing process. Compared to the driving circuit fabricated by thin-film transistors, the ICs 102 in the present disclosure have higher driving currents and faster response speeds. Thus, by using one embodiment of the present disclosure, the display device 100 may have better operating characteristics.

Moreover, in one embodiment, since the ICs 102 can be manufactured by a silicon semiconductor manufacturing process, the size thereof can be significantly shrunk. Compared to a driving circuit fabricated by thin-film transistors, the ICs 102 in the present disclosure have a far smaller size and as a consequence shield less light. Therefore, by using one embodiment of the present disclosure, the transparency of the display device 100 can be significantly increased.

In one embodiment, the widths WD and lengths LN of the ICs 102 are substantially identical to each other. With such a configuration, the ICs 102 will not be damaged when the substrate 110 (e.g., a flexible substrate) is bent. Therefore, the flexibility of the display device 100 can be increased.

In the following paragraphs, details of the ICs 102 in one embodiment of the present disclosure are provided with reference to FIG. 3.

In one embodiment, each of the ICs 102 includes a shift register unit 104, a voltage level shifter 106, a driving circuit 108, and low dropout regulators LO. In one embodiment, the voltage level shifter 106 is electrically coupled between the shift register unit 104 and the driving circuit 108. The driving circuit 108 is electrically coupled to the display unit LD. One of the low dropout regulators LO is electrically coupled between a voltage line with the supply voltage level HV and the shift register unit 104, and another one of the low dropout regulators LO is electrically coupled between a voltage line with the supply voltage level HV and the driving circuit 108.

In this embodiment, the shift register unit 104 is configured to receive the previous-stage scan signal S(n) and the clock signal CLK, delay the previous-stage scan signal S(n) according to the clock signal CLK to generate the current-stage scan signal S(n+1), and generate control signals E, S according to the current-stage scan signal S(n+1), the emitting signal EM, and the interrupt signal XON. In this embodiment, the pulse widths of the previous-stage scan signal S(n) and the current-stage scan signal S(n+1) are substantially identical to the duty cycle of the clock signal CLK.

It is noted that the shift register unit 104 is configured to make the driving circuit 108 stop driving the display unit LD according to the interrupt signal XON. Details of the interrupt signal XON will be specified in the paragraphs below. In addition, in some embodiments, the interrupt signal XON and corresponding components can be omitted.

In this embodiment, the voltage level shifter 106 is configured to receive the control signals E, S from the shift register unit 104, amplify the control signals E, S, and provide the amplified control signals E, S to the driving circuit 108. In some embodiments, the voltage level shifter 106 can be omitted.

In this embodiment, the driving circuit 108 is configured to receive the amplified control signals E, S from the voltage level shifter 106, and drive the corresponding display unit LD according to the amplified control signals E, S.

In this embodiment, the low dropout regulators LO are configured to receive the supply voltage level HV, regulate the supply voltage level HV to a supply voltage level VDD and a supply voltage level OVDD, provide the supply voltage level VDD to the shift register unit 104, and provide the supply voltage level OVDD to the driving circuit 108. In some embodiments, the low dropout regulators LO can be omitted.

With the configuration described above, the ICs 102 can generate the current-stage scan signals S(n+1) according to the previous-stage scan signals S(n), and accordingly drive the display units LD.

In one embodiment of the present disclosure, each of the shift register units 104 includes a latch LT, an AND gate, an OR gate OR, and a NOR gate NR.

In this embodiment, the input end D of the latch LT is configured to receive the previous-stage scan signals S(n), the clock input end CK of the latch LT is configured to receive the clock signal CLK, and the output end Q of the latch LT is electrically coupled to the first input end of the AND gate AD and the first input end of the NOR gate NR. The latch LT is configured to delay the previous-stage scan signal S(n) according to the clock signal CLK to generate the current-stage scan signal S(n+1).

In this embodiment, the second end of the AND gate AD is configured to receive the emitting signal EM. The output end of the AND gate AD is electrically coupled to the first input end of the OR gate OR. The AND gate AD is configured to perform a logical conjunction on the emitting signal EM and the current-stage scan signal S(n+1) to generate and output an AND gate output signal ADO.

In this embodiment, the second end of the OR gate OR is configured to receive the interrupt signal XON. The output end of the OR gate OR is electrically coupled to the voltage level shifter 106. The OR gate OR is configured to output the control signal E to the voltage level shifter 106 according to the AND gate output signal ADO and the interrupt signal XON.

In this embodiment, the second end of the NOR gate NR is configured to receive the interrupt signal XON. The output end of the NOR gate NR is electrically coupled to the voltage level shifter 106. The NOR gate NR is configured to output the control signal S to the voltage level shifter 106 according to the current-stage scan signal S(n+1) and the interrupt signal XON.

In one embodiment, the driving circuit 108 includes transistors T1-T3 and capacitors C1, C2.

In this embodiment, the first end (e.g., the drain end) of the transistor T1 is electrically coupled to the anode of the corresponding display unit LD. The transistor T1 is configured to generate a driving current ID flowing through the corresponding display unit LD according to a difference between voltage levels on the source and gate ends of the transistor T1.

In this embodiment, the transistor T2 is electrically coupled between the voltage line with the supply voltage level OVDD and the second end (e.g., the source end) of the transistor T1. The gate end of the transistor T2 is configured to receive the control signal E from the voltage level shifter

106. The transistor T2 is configured to conduct the supply voltage level OVDD to the second end of the transistor T1 according to the amplified control signal E.

In this embodiment, the transistor T3 is electrically coupled between the signal line of the data signal VDATA and the gate end of the transistor T1. The gate end of the transistor T3 is configured to receive the control signal S from the voltage level shifter 106. The transistor T3 is configured to conduct the data signal VDATA to the gate end of the transistor T1 according to the amplified control signal S.

In this embodiment, the capacitor C1 is electrically coupled between the voltage line with the supply voltage level OVDD and the second end of the transistor T1.

In this embodiment, the capacitor C2 is electrically coupled between the second end of the transistor T1 and the gate end of the transistor T1.

Figure 4:
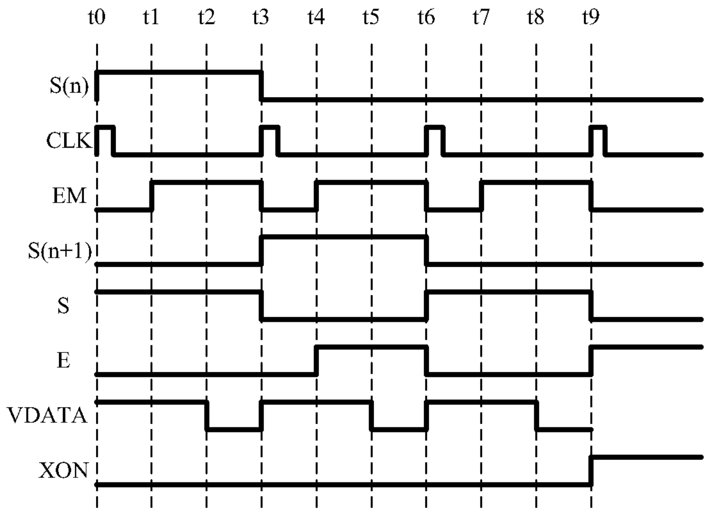
FIG. 4 illustrates signals of an IC according to one embodiment of the present disclosure.

In the following paragraphs, an operative embodiment of the IC 102 is provided with reference to FIGS. 3 and 4, but the disclosure is not limited in this regard.

During time points t0-t3, the previous-stage scan signal S(n) has a high voltage level, the current-stage scan signal S(n+1) has a low voltage level, and the interrupt signal XON has a low voltage level.

At this time, the AND gate AD outputs the AND gate output signal ADO with a low voltage level according to the current-stage scan signal S(n+1) with the low voltage level. The OR gate OR outputs the control signal E with a low voltage level according to the AND gate output signal ADO with the low voltage level and the interrupt signal XON with the low voltage level. The NOR gate NR outputs the control signal S with a high voltage level according to the current-stage scan signal S(n+1) with the low voltage level and the interrupt signal XON with the low voltage level.

The transistor T2 conducts the supply voltage level OVDD to the second end of the transistor T1 according to the control signal E with the low voltage level. The transistor T3 turns off according to the control signal S with the high voltage level.

Subsequently, during time points t3-t4 (e.g., a reset stage), the previous-stage scan signal S(n) has a low voltage level, the latch LT outputs the current-stage scan signal S(n+1) with a high voltage level according to the clock signal CLK, the emitting signal EM has a low voltage level, and the interrupt signal XON has a low voltage level.

At this time, the AND gate AD outputs the AND gate output signal ADO with a low voltage level according to the current-stage scan signal S(n+1) with the high voltage level and the emitting signal EM with the low voltage level. The OR gate OR outputs the control signal E with a low voltage level according to the AND gate output signal ADO with the low voltage level and the interrupt signal XON with the low voltage level. The NOR gate NR outputs the control signal S with a low voltage level according to the current-stage scan signal S(n+1) with the high voltage level and the interrupt signal XON with the low voltage level.

The transistor T2 conducts the supply voltage level OVDD to the second end of the transistor T1 according to the control signal E with the low voltage level. The transistor T3 turns on according to the control signal S with the low voltage level, so as to allow the capacitor C2 to be charged via the transistor T3 and to be reset.

Subsequently, during time points t4-t5 (e.g., a compensation stage), the previous-stage scan signal S(n) has a low voltage level, the current-stage scan signal S(n+1) has a high voltage level, the emitting signal EM has a high voltage level, and the interrupt signal XON has a low voltage level.

At this time, the AND gate AD outputs the AND gate output signal ADO with a high voltage level according to the current-stage scan signal S(n+1) with the high voltage level and the emitting signal EM with the high voltage level. The OR gate OR outputs the control signal E with a high voltage level according to the AND gate output signal ADO with the high voltage level and the interrupt signal XON with the low voltage level. The NOR gate NR outputs the control signal S with a low voltage level according to the current-stage scan signal S(n+1) with the high voltage level and the interrupt signal XON with the low voltage level.

The transistor T2 turns off according to the control signal E with the high voltage level. The transistor T3 turns on according to the control signal S with the low voltage level. At this time, the threshold voltage of the transistor T1 is recorded in the capacitor C1.

Subsequently, during time points t5-t6 (e.g., a writing stage), the previous-stage scan signal S(n) has a low voltage level, the current-stage scan signal S(n+1) has a high voltage level, the emitting signal EM has a high voltage level, and the interrupt signal XON has a low voltage level.

At this time, the AND gate AD outputs the AND gate output signal ADO with a high voltage level according to the current-stage scan signal S(n+1) with the high voltage level and the emitting signal EM with the high voltage level. The OR gate OR outputs the control signal E with a high voltage level according to the AND gate output signal ADO with the high voltage level and the interrupt signal XON with the low voltage level. The NOR gate NR outputs the control signal S with a low voltage level according to the current-stage scan signal S(n+1) with the high voltage level and the interrupt signal XON with the low voltage level.

The transistor T2 turns off according to the control signal E with the high voltage level. The transistor T3 turns on according to the control signal S with the low voltage level, such that the data signal VDATA can be written into the capacitor C2.

Subsequently, during time points t6-t9 (e.g., an emitting stage), the previous-stage scan signal S(n) has a low voltage level, the current-stage scan signal S(n+1) has a low voltage level, and the interrupt signal XON has a low voltage level.

At this time, the AND gate AD outputs the AND gate output signal ADO with a low voltage level according to the current-stage scan signal S(n+1) with the low voltage level. The OR gate OR outputs the control signal E with a low voltage level according to the AND gate output signal ADO with the low voltage level and the interrupt signal XON with the low voltage level. The NOR gate NR outputs the control signal S with a high voltage level according to the current-stage scan signal S(n+1) with the low voltage level and the interrupt signal XON with the low voltage level.

The transistor T2 conducts the supply voltage level OVDD to the second end of the transistor T1 according to the control signal E with the low voltage level. The transistor T3 turns off according to the control signal S with the high voltage level. At this time, the transistor T1 generates the driving current ID according to the difference (i.e., a voltage difference between two ends of the capacitor C2) between the voltage levels on its second end (source end) and gate end, to drive the corresponding display unit LD.

Subsequently, after time point t9 (e.g., during a shutdown stage), the interrupt signal XON has a high voltage level.

At this time, the OR gate OR outputs the control signal E with a high voltage level according to the interrupt signal XON with the high voltage level. The NOR gate NR outputs the control signal S with a low voltage level according to the interrupt signal XON with the high voltage level.

The transistor T2 turns off according to the control signal E with the high voltage level. The transistor T3 turns on according to the control signal S with the low voltage level, such that the charge in the capacitor C2 can be released via the transistor T3. In such a manner, an after-image can be avoided when the display device 100 is shutdown.

It is noted that the interrupt signal XON can be converted to a high voltage level at any time point to interrupt the operations of the display device 100 or to shutdown the display device 100, and the present disclosure is not limited by the embodiment described above.

Through the configuration described above, the IC 102 in one embodiment of the present disclosure can be realized. By utilizing the IC 102, the non-active area 114 can be significantly shrunk since it is not necessary to dispose a scan circuit therein.

Figure 5:
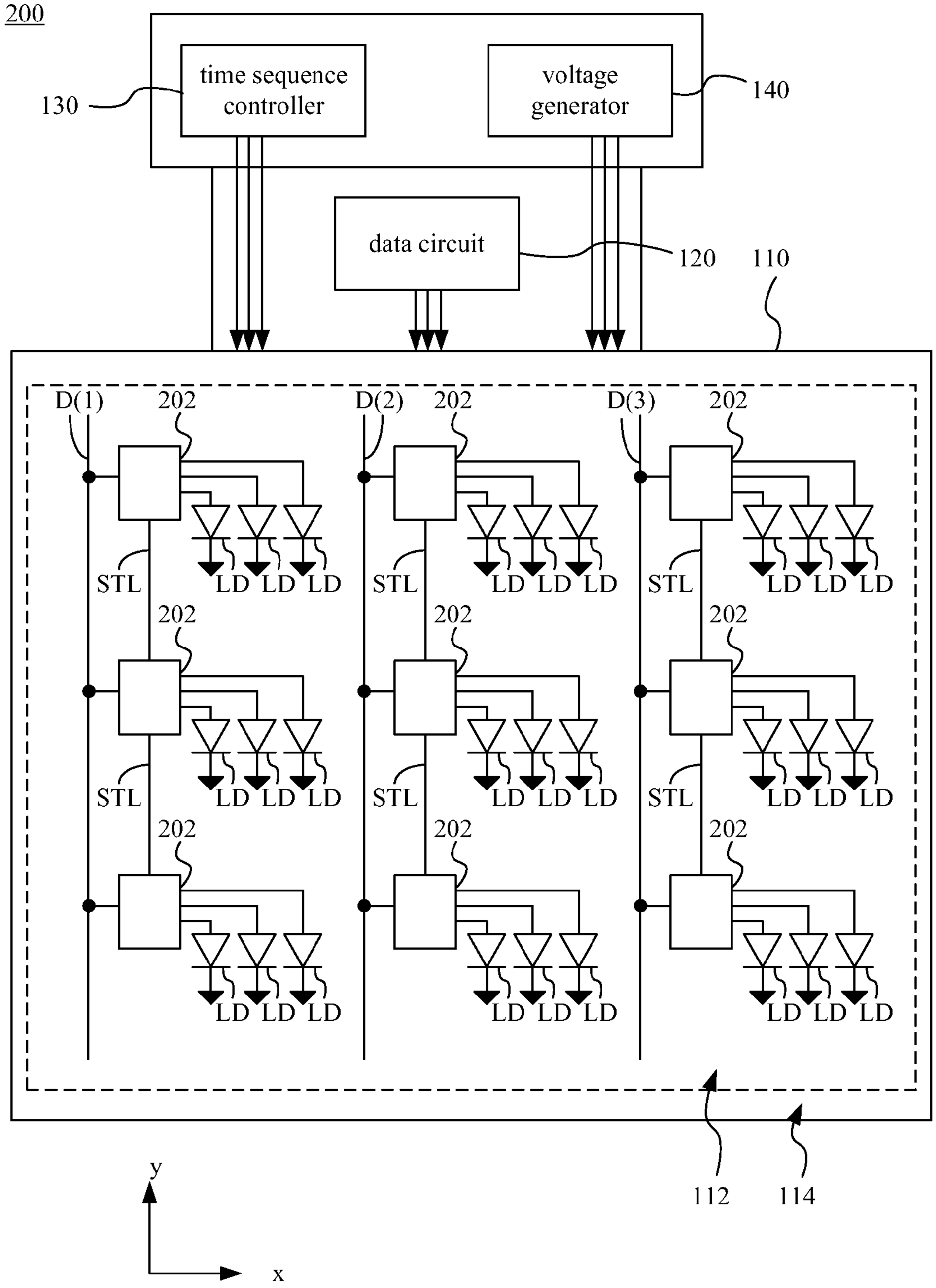
FIG. 5 is a schematic diagram of a display device according to another embodiment of the present disclosure.
Figure 6:
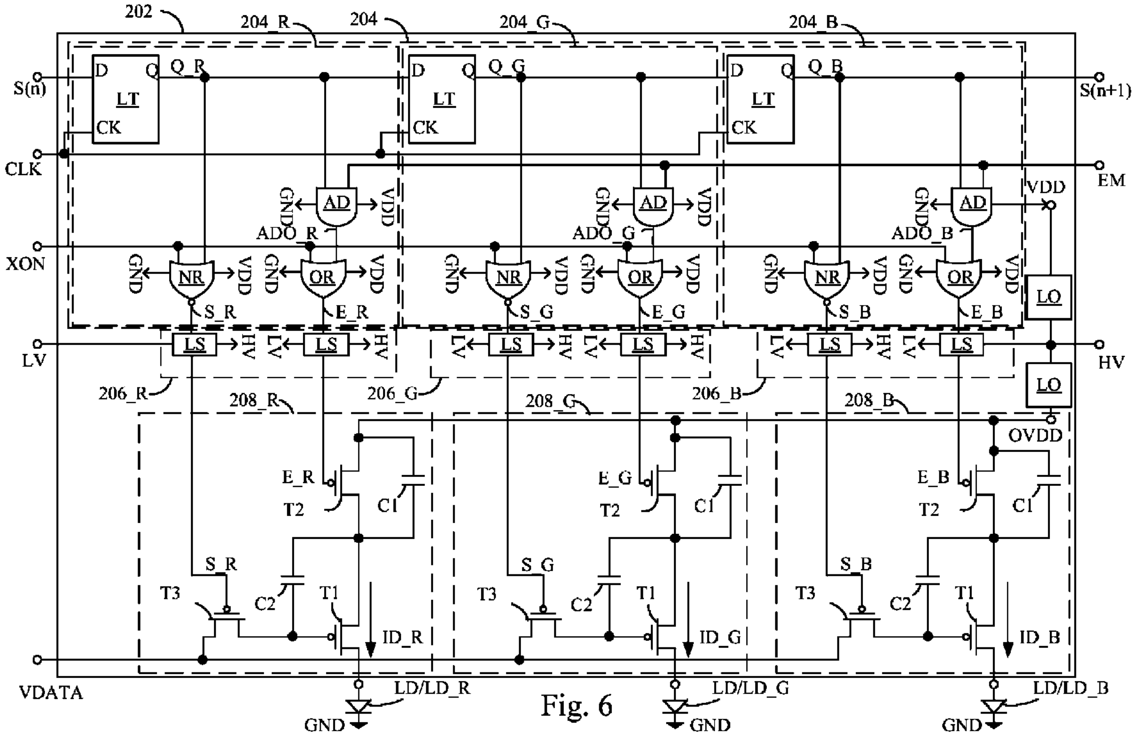
FIG. 6 is a schematic diagram of an IC according to another embodiment of the present disclosure.
Figure 7:
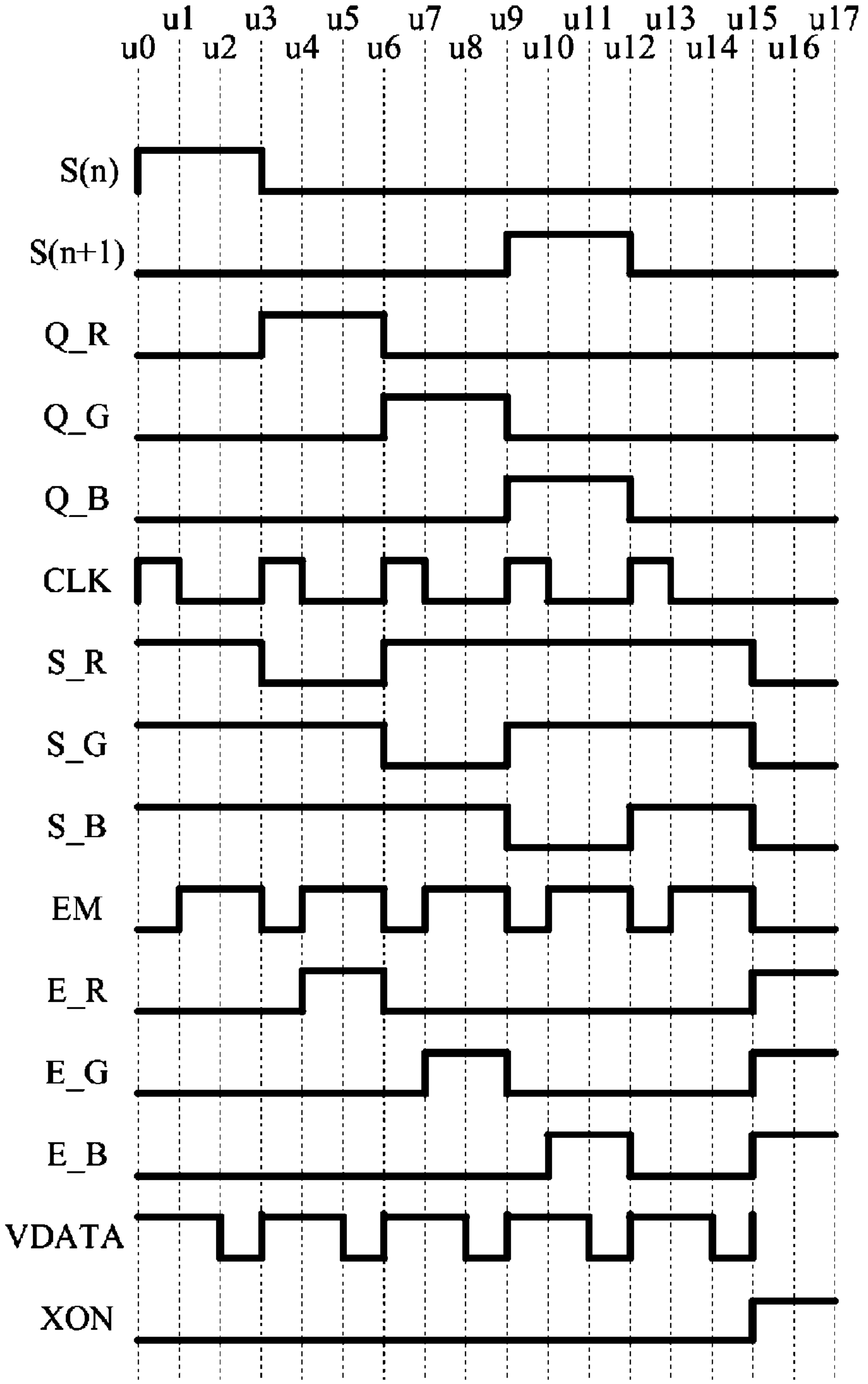
FIG. 7 illustrates signals of an IC according to another embodiment of the present disclosure.

In the following paragraphs, another embodiment of the present disclosure is described with reference to FIGS. 5-7.

In this embodiment, the display device 200 may include a substrate 110, a data circuit 120, a time sequence controller 130, a voltage generator 140, ICs 202, data lines D(1)-D(3), scan signal transmission lines STL, display units LD and bonding pad sets BDS. It is noted that the numbers of the elements described herein are given for illustrative purposes, and such numbers are not limited to this embodiment.

It is also noted that the display device 200 is substantially the same as the display device 100 in the previous embodiment, and the main difference is that, in the display device 200 of this embodiment, each of the ICs 202 is configured to drive a plurality of the display units LD. Thus, in the following paragraphs, a description of many aspects that are similar will not be repeated.

In this embodiment, each of the bonding pad sets BDS is electrically coupled to a plurality of the display units LD. That is, a plurality of the bonding pads of each of bonding pad sets BDS are separately electrically coupled to a plurality of the display units LD. In another aspect, each of the ICs is electrically coupled to a plurality of the display units LD, so as to drive the plurality of the corresponding display units LD.

In one embodiment, one of the ICs 202 is configured to drive a red driving unit LD_R, a blue driving unit LD_B, and a green driving unit LD_G, so as to enable an image of a pixel to be displayed.

Through the configuration described above, in addition to enabling the non-active area 114 to be significantly shrunk, the numbers of the ICs 202 and the wiring on the substrate 110 can be decreased since it is not necessary to drive each of the display units LD by different ICs 202. Additionally, the ICs 202 used to drive adjacent display units LD can be packaged together to decrease the usage of space.

Details of the substrate 110, the data circuit 120, the time sequence controller 130, the voltage generator 140, the ICs 202, the data lines D(1)-D(3), the scan signal transmission lines STL, the display units LD, and the bonding pad sets BDS can be ascertained by referring to the paragraphs described above, and a description in this regard is not repeated herein.

In the following description, details of the ICs 202 in one embodiment of the present disclosure are provided with reference to FIG. 6.

In one embodiment, each of the ICs 202 includes a shift register unit 204, voltage level shifters 206_R, 206_G, 206_B, driving circuits 208_R, 208_G, 208_B, and low dropout regulators LO.

In this embodiment, the shift register unit 204 includes sub-shift register units 204_R, 204_G, 204_B. The sub-shift register units 204_R, 204_G, 204_B are electrically coupled in series to each other.

In this embodiment, the voltage level shifters 206_R, 206_G, 206_B are electrically coupled between the sub-shift register units 204_R, 204_G, 204_B and the driving circuits 208_R, 208_G, 208_B respectively. The driving circuit 208_R, 208_G, 208_B are electrically coupled to the display units LD_R, LD_G, LD_B respectively. One of the low dropout regulators LO is electrically coupled between a voltage line with the supply voltage level HV and the sub-shift register units 204_R, 204_G, 204_B, and another one of the low dropout regulators LO is electrically coupled between the voltage line with the supply voltage level HV and the driving circuit 208_R, 208_G, 208_B.

In this embodiment, the sub-shift register unit 204_R is configured to receive the previous-stage scan signal S(n) and the clock signal CLK, delay the previous-stage scan signal S(n) according to the clock signal CLK to generate a sub-scan signal Q_R, and provide the sub-scan signal Q_R to the sub-shift register unit 204_G. In addition, the sub-shift register unit 204_R is configured to generate control signals E_R, S_R according to the sub-scan signal Q_R, the emitting signal EM, and the interrupt signal XON.

In this embodiment, the sub-shift register unit 204_G is configured to receive the sub-scan signal Q_R and the clock signal CLK, delay the sub-scan signal Q_R according to the clock signal CLK to generate a sub-scan signal Q_G, and provide the sub-scan signal Q_G to the sub-shift register unit 204_B. In addition, the sub-shift register unit 204_G is configured to generate control signals E_G, S_G according to the sub-scan signal Q_G, the emitting signal EM, and the interrupt signal XON.

In this embodiment, the sub-shift register unit 204_B is configured to receive the sub-scan signal Q_G and the clock signal CLK, delay the sub-scan signal Q_G according to the clock signal CLK to generate a sub-scan signal Q_B, and provide the sub-scan signal Q_B to the scan signal transmission line STL to serve as the current-stage scan signal S(n+1) of this shift register unit 204. In addition, the sub-shift register unit 204_B is configured to generate control signals E_B, S_B according to the sub-scan signal Q_B, the emitting signal EM, and the interrupt signal XON.

In another aspect, each of the ICs 202 corresponds to N corresponding display units LD (e.g., the display units LD_R, LD_G, LD_B) among the display units LD, in which N is an integer greater than 1 (e.g., N is equal to 3). Each of the shift register units 204 includes a plurality of sub-shift register units (e.g., the sub-shift register units 204_R, 204_G, 204_B) electrically coupled in series. Each of the sub-shift register units is configured to delay a previous-stage sub-scan signal (e.g., S(n), Q_R, Q_G) to generate a current-stage sub-scan signal (e.g., Q_R, Q_G, Q_B).

The $1^{st}$ sub-shift register unit (e.g., the sub-shift register unit 204_R) uses the previous-stage scan signal S(n) from the scan signal transmission line STL as its previous-stage sub-scan signal.

Each of the $1^{st}$ to $(N-1)^{th}$ sub-shift register units (e.g., the sub-shift register units 204_R, 204_G) transmits the current-stage sub-scan signal to a next sub-shift register unit to serve as the previous-stage sub-scan signal of the next sub-shift register unit.

The current-stage sub-scan signal of the $N^{th}$ sub-shift register unit (e.g., the sub-shift register unit 204_B) serves as the current-stage scan signal S(n+1) provided to the scan signal transmission line STL by the shift register unit 204.

In one embodiment, the pulse widths of the scan signal S(n) and the sub-scan signals Q_R, Q_G, Q_B are identical to each other, and the phases of the scan signal S(n) and the sub-scan signals Q_R, Q_G, Q_B are different from each other. In one embodiment, the pulse widths of the scan signal S(n) and the sub-scan signals Q_R, Q_G, Q_B are substantially identical to the cycle period of the clock signal CLK.

In this embodiment, the voltage level shifters 206_R, 206_G, 206_B are configured to receive the control signals E_R, S_R, E_G, S_G, E_B, S_B from the sub-shift register units 204_R, 204_G, 204_B respectively, amplify the control signals E_R, S_R, E_G, S_G, E_B, S_B, and provide the amplified control signals E_R, S_R, E_G, S_G, E_B, S_B to the driving circuit 208_R, 208_G, 208_B respectively. In some embodiments, the voltage level shifters 206_R, 206_G, 206_B can be omitted.

In this embodiment, the driving circuits 208_R, 208_G, 208_B are configured to receive the amplified control signals E_R, S_R, E_G, S_G, E_B, S_B from the voltage level shifters 206_R, 206_G, 206_B respectively, and drive the display units LD_R, LD_G, LD_B according to the amplified control signals E_R, S_R, E_G, S_G, E_B, S_B respectively. In one embodiment, the driving circuits 208_R, 208_G, 208_B are configured to respectively provide driving currents ID_R, ID_G, ID_B to the corresponding display units LD_R, LD_G, LD_B according to differences of voltages on source ends and gate ends of driving transistors therein.

In this embodiment, the low dropout regulators LO are configured to receive the supply voltage level HV, regulate the supply voltage level HV to a supply voltage level VDD and a supply voltage level OVDD, provide the supply voltage level VDD to the sub-shift register units 204_R, 204_G, 204_B, and provide the supply voltage level OVDD to the driving circuit 208_R, 208_G, 208_B. In some embodiments, the low dropout regulators LO can be omitted.

With the configuration described above, the ICs 202 can separately drive the corresponding display units LD_R, LD_G, LD_B.

Additionally, in this embodiment, the sub-shift register units 204_R, 204_G, 204_B sequentially generate the control signals E_R, S_R, E_G, S_G, E_B, S_B, so as to make the driving circuits 208_R, 208_G, 208_B sequentially drive the display units LD_R, LD_G, LD_B according to the control signals E_R, S_R, E_G, S_G, E_B, S_B respectively.

It is noted that, in this embodiment, the structures and operations of the sub-shift register units 204_R, 204_G, 204_B are substantially identical to the structure and operation of the shift register unit 104 in the previous embodiment. Therefore, a description of many aspects that are similar will not be repeated. In addition, the structures and operations of the voltage level shifters 206_R, 206_G, 206_B are substantially identical to the structure and operation of the voltage level shifter 106 in the previous embodiment. Therefore, a description of many aspects that are similar will not be repeated. Moreover, the structures and operations of the driving circuits 208_R, 208_G, 208_B are substantially identical to the structure and operation of the driving circuit 108 in the previous embodiment. Therefore, a description of many aspects that are similar will not be repeated.

In the following paragraphs, an operative embodiment of the IC 202 is provided with reference to FIGS. 6 and 7, but the disclosure is not limited in this regard.

During time points u0-u3, the previous-stage scan signal S(n) has a high voltage level, the sub-scan signal Q_R has a low voltage level, the sub-scan signal Q_G has a low voltage level, the sub-scan signal Q_B has a low voltage level, the current-stage scan signal S(n+1) has a low voltage level, and the interrupt signal XON has a low voltage level.

At this time, the AND gate AD of the sub-shift register unit 204_R outputs the AND gate output signal ADO_R with a low voltage level according to the sub-scan signal Q_R with the low voltage level. The OR gate OR of the sub-shift register unit 204_R outputs the control signal E_R with a low voltage level according to the AND gate output signal ADO_R with the low voltage level and the interrupt signal XON with the low voltage level. The NOR gate NR of the sub-shift register unit 204_R outputs the control signal S_R with a high voltage level according to the sub-scan signal Q_R with the low voltage level and the interrupt signal XON with the low voltage level.

The transistor T2 of the driving circuit 208_R conducts the supply voltage level OVDD to the second end of the transistor T1 of the driving circuit 208_R according to the control signal E_R with the low voltage level. The transistor T3 of the driving circuit 208_R turns off according to the control signal S_R with the high voltage level.

Subsequently, during time points u3-u4, the previous-stage scan signal S(n) has a low voltage level, the latch LT of the sub-shift register unit 204_R outputs the sub-scan signal Q_R with a high voltage level according to the clock signal CLK, the sub-scan signal Q_G has a low voltage level, the sub-scan signal Q_B has a low voltage level, the current-stage scan signal S(n+1) has a low voltage level, the emitting signal EM has a low voltage level, and the interrupt signal XON has a low voltage level.

At this time, the AND gate AD of the sub-shift register unit 204_R outputs the AND gate output signal ADO_R with a low voltage level according to the sub-scan signal Q_R with the high voltage level and the emitting signal EM with the low voltage level. The OR gate OR of the sub-shift register unit 204_R outputs the control signal E_R with a low voltage level according to the AND gate output signal ADO_R with the low voltage level and the interrupt signal XON with the low voltage level. The NOR gate NR of the sub-shift register unit 204_R outputs the control signal S_R with a low voltage level according to the sub-scan signal Q_R with the high voltage level and the interrupt signal XON with the low voltage level.

The transistor T2 of the driving circuit 208_R conducts the supply voltage level OVDD to the second end of the transistor T1 of the driving circuit 208_R according to the control signal E_R with the low voltage level. The transistor T3 of the driving circuit 208_R turns on according to the control signal S_R with the low voltage level, so as to allow the capacitor C2 of the driving circuit 208_R to be charged via the transistor T3 of the driving circuit 208_R and to be reset.

Subsequently, during time points u4-u5, the previous-stage scan signal S(n) has a low voltage level, the sub-scan signal Q_R has a high voltage level, the sub-scan signal Q_G has a low voltage level, the sub-scan signal Q_B has a low voltage level, the current-stage scan signal S(n+1) has a low voltage level, the emitting signal EM has a high voltage level, and the interrupt signal XON has a low voltage level.

At this time, the AND gate AD of the sub-shift register unit 204_R outputs the AND gate output signal ADO_R with a high voltage level according to the sub-scan signal Q_R with the high voltage level and the emitting signal EM with the high voltage level. The OR gate OR of the sub-shift register unit 204_R outputs the control signal E_R with a high voltage level according to the AND gate output signal ADO_R with the high voltage level and the interrupt signal XON with the low voltage level. The NOR gate NR of the sub-shift register unit 204_R outputs the control signal S_R with a low voltage level according to the sub-scan signal Q_R with the high voltage level and the interrupt signal XON with the low voltage level.

The transistor T2 of the driving circuit 208_R turns off according to the control signal E_R with the high voltage level. The transistor T3 of the driving circuit 208_R turns on according to the control signal S_R with the low voltage level. At this time, the threshold voltage of the transistor T1 of the driving circuit 208_R is recorded in the capacitor C1 of the driving circuit 208_R.

Subsequently, during time points u5-u6, the previous-stage scan signal S(n) has a low voltage level, the sub-scan signal Q_R has a high voltage level, the sub-scan signal Q_G has a low voltage level, the sub-scan signal Q_B has a low voltage level, the current-stage scan signal S(n+1) has a low voltage level, the emitting signal EM has a high voltage level, and the interrupt signal XON has a low voltage level.

At this time, the AND gate AD of the sub-shift register unit 204_R outputs the AND gate output signal ADO_R with a high voltage level according to the sub-scan signal Q_R with the high voltage level and the emitting signal EM with the high voltage level. The OR gate OR of the sub-shift register unit 204_R outputs the control signal E_R with a high voltage level according to the AND gate output signal ADO_R with the high voltage level and the interrupt signal XON with the low voltage level. The NOR gate NR of the sub-shift register unit 204_R outputs the control signal S_R with a low voltage level according to the sub-scan signal Q_R with the high voltage level and the interrupt signal XON with the low voltage level.

The transistor T2 of the driving circuit 208_R turns off according to the control signal E_R with the high voltage level. The transistor T3 of the driving circuit 208_R turns on according to the control signal S_R with the low voltage level, such that the data signal VDATA can be written into the capacitor C2 of the driving circuit 208_R.

Subsequently, during time points u6-u9, the previous-stage scan signal S(n) has a low voltage level, the sub-scan signal Q_R has a low voltage level, the sub-scan signal Q_G has a high voltage level, the sub-scan signal Q_B has a low voltage level, the current-stage scan signal S(n+1) has a low voltage level, and the interrupt signal XON has a low voltage level.

At this time, the AND gate AD of the sub-shift register unit 204_R outputs the AND gate output signal ADO_R with a low voltage level according to the sub-scan signal Q_R with the high voltage level. The OR gate OR of the sub-shift register unit 204_R outputs the control signal E_R with a low voltage level according to the AND gate output signal ADO_R with the low voltage level and the interrupt signal XON with the low voltage level. The NOR gate NR of the sub-shift register unit 204_R outputs the control signal S_R with a high voltage level according to the sub-scan signal Q_R with the low voltage level and the interrupt signal XON with the low voltage level.

The transistor T2 of the driving circuit 208_R conducts the supply voltage level OVDD to the second end of the transistor T1 of the driving circuit 208_R according to the control signal E_R with the low voltage level. The transistor T3 of the driving circuit 208_R turns off according to the control signal S_R with the high voltage level. At this time, the transistor T1 of the driving circuit 208_R generates the driving current ID_R according to the difference (i.e., a voltage difference between two ends of the capacitor C2 of the driving circuit 208_R) between the voltage levels on its second end (source end) and gate end, to drive the corresponding display unit LD_R.

It is noted that, although the operations of the elements inside the sub-shift register units 204_G, 204_B and the driving circuits 208_G, 208_B lag behind the operations of the elements inside the sub-shift register unit 204_R and the driving circuit 208_R for one or two cycle period(s) of the clock signal CLK, the operations of the elements inside the sub-shift register units 204_G, 204_B and the driving circuits 208_G, 208_B are substantially the same as the operations of the elements inside the sub-shift register unit 204_R and the driving circuit 208_R. Thus, a description of many aspects that are similar will not be repeated.

After time point u15, the interrupt signal XON has a high voltage level.

At this time, the OR gates OR of the sub-shift register units 204_R, 204_G, 204_B output the control signals E_R, E_G, E_B with high voltage levels according to the interrupt signal XON with the high voltage level respectively. The NOR gates NR of the sub-shift register units 204_R, 204_G, 204_B output the control signals S_R, S_G, S_B with low voltage levels according to the interrupt signal XON with the high voltage level respectively.

The transistors T2 of the driving circuits 208_R, 208_G, 208_B turn off according to the control signals E_R, E_G, E_B with the high voltage levels respectively. The transistors T3 of the driving circuits 208_R, 208_G, 208_B turn on according to the control signals S_R, S_G, S_B with the low voltage levels respectively, such that the charge in the capacitors C2 of the driving circuits 208_R, 208_G, 208_B can be released via the transistors T3 of the driving circuits 208_R, 208_G, 208_B respectively. In such a manner, an after-image can be avoided when the display device 200 is shutdown.

It is noted that the interrupt signal XON can be converted to a high voltage level at any time point to interrupt the operations of the display device 200 or to shutdown the display device 200, and the present disclosure is not limited by the embodiment described above.

Through the configuration described above, the IC 202 in one embodiment of the present disclosure can be realized. By utilizing the IC 202, the non-active area 114 can be significantly shrunk since it is not necessary to dispose a scan circuit therein.

In the following paragraphs, another embodiment of the present disclosure is provided with reference to FIGS. 8 and 9.

In this embodiment, another type of ICs 302 can be used in the display device 200, and each of the ICs 302 can drive a plurality of the display units LD. The ICs 302 are substantially the same as the ICs 202 in the previous embodiment. Thus, in the paragraphs below, a description of many aspects that are similar will not be repeated.

Figure 8:
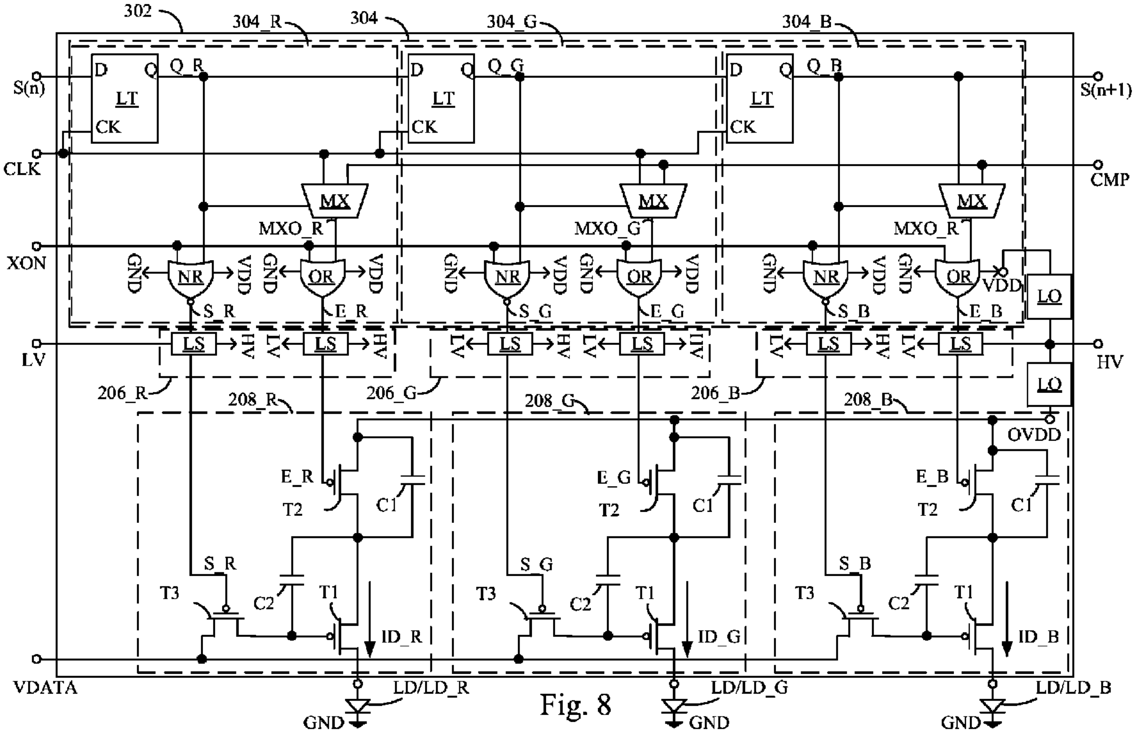
FIG. 8 is a schematic diagram of an IC according to another embodiment of the present disclosure.
Figure 9:
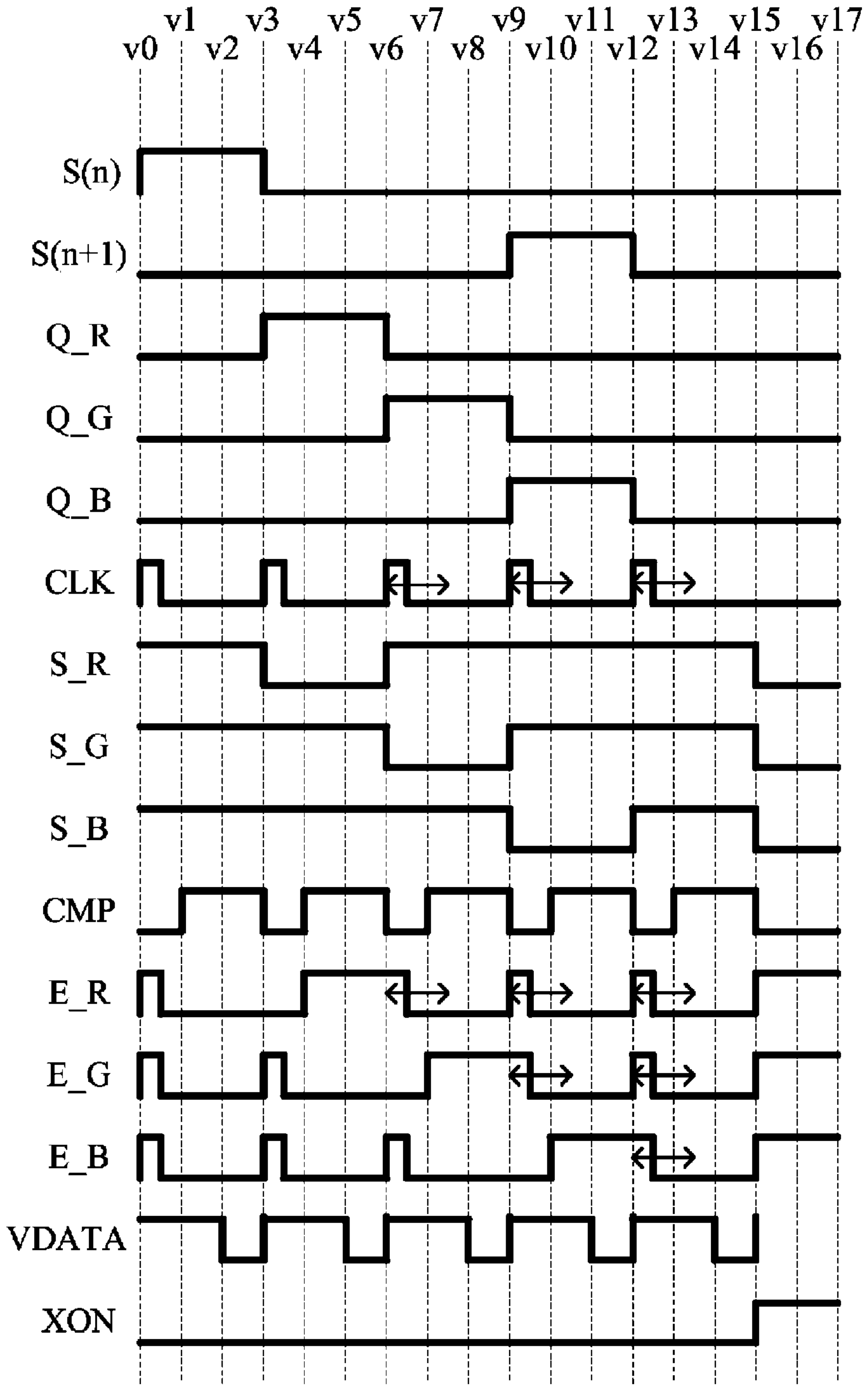
FIG. 9 illustrates signals of an IC according to another embodiment of the present disclosure.

Particular reference is made to FIG. 8. In this embodiment, one of the ICs 302 includes a shift register unit 304, voltage level shifters 206_R, 206_G, 206_B, driving circuits 208_R, 208_G, 208_B, and low dropout regulators LO.

In this embodiment, the shift register unit 304 includes sub-shift register units 304_R, 304_G, 304_B. The sub-shift register units 304_R, 304_G, 304_B are electrically coupled in series to each other.

In this embodiment, the voltage level shifters 206_R, 206_G, 206_B are electrically coupled between the sub-shift register units 304_R, 304_G, 304_B and the driving circuits 208_R, 208_G, 208_B respectively. The driving circuits 208_R, 208_G, 208_B are electrically coupled to the display units LD_R, LD_G, LD_B respectively. One of the low dropout regulators LO is electrically coupled between a voltage line with the supply voltage level HV and the sub-shift register units 204_R, 204_G, 204_B, and another one of the low dropout regulators LO is electrically coupled between the voltage line with the supply voltage level HV and the driving circuits 208_R, 208_G, 208_B.

In this embodiment, the sub-shift register unit 304_R is configured to receive the previous-stage scan signal S(n) and the clock signal CLK, delay the previous-stage scan signal S(n) according to the clock signal CLK to generate a sub-scan signal Q_R, and provide the sub-scan signal Q_R to the sub-shift register unit 304_G. In addition, the sub-shift register unit 304_R is configured to generate control signals E_R, S_R according to the sub-scan signal Q_R, the compensation signal CMP, and the interrupt signal XON.

In this embodiment, the sub-shift register unit 304_G is configured to receive the sub-scan signal Q_R and the clock signal CLK, delay the sub-scan signal Q_R according to the clock signal CLK to generate a sub-scan signal Q_G, and provide the sub-scan signal Q_G to the sub-shift register unit 304_B. In addition, the sub-shift register unit 304_G is configured to generate control signals E_G, S_G according to the sub-scan signal Q_G, the compensation signal CMP, and the interrupt signal XON.

In this embodiment, the sub-shift register unit 304_B is configured to receive the sub-scan signal Q_G and the clock signal CLK, delay the sub-scan signal Q_G according to the clock signal CLK to generate a sub-scan signal Q_B, and provide the sub-scan signal Q_B to the scan signal transmission line STL to serve as the current-stage scan signal S(n+1) of this shift register unit 304. In addition, the sub-shift register unit 304_B is configured to generate control signals E_B, S_B according to the sub-scan signal Q_B, the compensation signal CMP, and the interrupt signal XON.

In one embodiment, the pulse widths of the scan signal S(n) and the sub-scan signals Q_R, Q_G, Q_B are identical to each other, and the phases of the scan signal S(n) and the sub-scan signals Q_R, Q_G, Q_B are different from each other. In one embodiment the pulse widths of the scan signal S(n) and the sub-scan signals Q_R, Q_G, Q_B are substantially identical to the cycle period of the clock signal CLK. In one embodiment, the cycle period of the clock signal CLK can be adjusted on the basis of actual requirements. Details in this regard will be specified in the paragraphs below.

In this embodiment, each of the sub-shift register units 304_R, 304_G, 304_B includes a latch LT, a multiplexer MX, an OR gate OR, and a NOR gate NR.

In this embodiment, the input ends D of the latches LT of the sub-shift register units 304_R, 304_G, 304_B are configured to receive signals S(n), Q_R, Q_G respectively, the clock input ends CK of the latches LT are configured to receive the clock signal CLK, and the output ends Q of the latches LT are electrically coupled to the first input ends of the NOR gates NR. The latches LT are configured to delay the signals S(n), Q_R, Q_G according to the clock signal CLK to generate the signals Q_R, Q_G, Q_B respectively.

In this embodiment, the first ends of the multiplexers MX are configured to receive the clock signal CLK. The second ends of the multiplexers MX are configured to receive the compensation signal CMP. The control ends of the multiplexers MX of the sub-shift register units 304_R, 304_G, 304_B are configured to receive the sub-scan signals Q_R, Q_G, Q_B respectively. The output ends of the multiplexers MX are electrically coupled to the first ends of the OR gates OR. The multiplexers MX of the sub-shift register units 304_R, 304_G, 304_B are configured to selectively output one of the compensation signal CMP and clock signal CLK to serve as the multiplexer output signals MXO_R, MXO_G, MXO_B respectively.

In this embodiment, the second ends of the OR gates OR are configured to receive the interrupt signal XON. The output ends of the OR gates OR of the sub-shift register units 304_R, 304_G, 304_B are electrically coupled to the voltage level shifters 206_R, 206_G, 206_B respectively. The OR gates OR of the sub-shift register units 304_R, 304_G, 304_B are configured to output the control signals E_R, E_G, E_B to the voltage level shifters 206_R, 206_G, 206_B according to the multiplexer output signals MXO_R, MXO_G, MXO_B and the interrupt signal XON respectively.

In this embodiment, the second ends of the NOR gates NR are configured to receive the interrupt signal XON. The output ends of the NOR gate NR of the sub-shift register units 304_R, 304_G, 304_B are electrically coupled to the voltage level shifters 206_R, 206_G, 206_B respectively. The NOR gate NR are configured to output the control signals S_R, S_G, S_B to the voltage level shifters 206_R, 206_G, 206_B according to the sub-scan signals Q_R, Q_G, Q_B and the interrupt signal XON respectively.

It is noted that details of the voltage level shifters 206_R, 206_G, 206_B, the driving circuit 208_R, 208_G, 208_B, and the low dropout regulators LO can be ascertained by referring to the paragraphs described above, and a description in this regard will not be repeated herein.

Through the configuration described above, the luminance of the display device 200 can be modulated by adjusting the cycle period of the clock signal CLK. Details in this regard are provided in the following operative embodiment.

In the following paragraphs, an operative embodiment of the IC 302 is provided with reference to FIGS. 8 and 9, but the disclosure is not limited in this regard.

During time points v0-v3, the previous-stage scan signal S(n) has a high voltage level, the sub-scan signal Q_R has a low voltage level, the sub-scan signal Q_G has a low voltage level, the sub-scan signal Q_B has a low voltage level, the current-stage scan signal S(n+1) has a low voltage level, and the interrupt signal XON has a low voltage level.

At this time, the multiplexer MX of the sub-shift register unit 304_R outputs the clock signal CLK to serve as the multiplexer output signal MX_R according to the sub-scan signal Q_R with the low voltage level. The OR gate OR of the sub-shift register unit 304_R outputs the control signal E_R with a waveform identical to a waveform of the clock signal CLK according to the multiplexer output signal MX_R and the interrupt signal XON with the low voltage level. The NOR gate NR of the sub-shift register unit 304_R outputs the control signal S_R with a high voltage level according to the sub-scan signal Q_R with the low voltage level and the interrupt signal XON with the low voltage level.

The transistor T2 of the driving circuit 208_R operatively conducts the supply voltage level OVDD to the second end of the transistor T1 of the driving circuit 208_R according to the control signal E_R with the waveform identical to the waveform of the clock signal CLK. The transistor T3 of the driving circuit 208_R turns off according to the control signal S_R with the high voltage level.

It is noted that, at this time, the operations of the elements inside the sub-shift register units 304_G, 304_B and the driving circuits 208_G, 208_B are identical to the operations of the elements inside the sub-shift register unit 304_R and the driving circuit 208_R. Thus, a description of many aspects that are similar will not be repeated.

Subsequently, during time points v3-v4, the previous-stage scan signal S(n) has a low voltage level, the latch LT of the sub-shift register unit 304_R outputs the sub-scan signal Q_R with a high voltage level according to the clock signal CLK, the sub-scan signal Q_G has a low voltage level, the sub-scan signal Q_B has a low voltage level, the current-stage scan signal S(n+1) has a low voltage level, the compensation signal CMP has a low voltage level, and the interrupt signal XON has a low voltage level.

At this time, the multiplexer MX of the sub-shift register unit 304_R outputs the compensation signal CMP with the low voltage level to serve as the multiplexer output signal MX_R according to the sub-scan signal Q_R with the high voltage level. The OR gate OR of the sub-shift register unit 304_R outputs the control signal E_R with a low voltage level according to the multiplexer output signal MX_R with the low voltage level and the interrupt signal XON with the low voltage level. The NOR gate NR of the sub-shift register unit 304_R outputs the control signal S_R with a low voltage level according to the sub-scan signal Q_R with the high voltage level and the interrupt signal XON with the low voltage level.

The transistor T2 of the driving circuit 208_R conducts the supply voltage level OVDD to the second end of the transistor T1 of the driving circuit 208_R according to the control signal E_R with the low voltage level. The transistor T3 of the driving circuit 208_R turns on according to the control signal S_R with the low voltage level, so as to allow the capacitor C2 of the driving circuit 208_R to be charged via the transistor T3 of the driving circuit 208_R and to be reset.

Subsequently, during time points v4-v5, the previous-stage scan signal S(n) has a low voltage level, the sub-scan signal Q_R has a high voltage level, the sub-scan signal Q_G has a low voltage level, the sub-scan signal Q_B has a low voltage level, the current-stage scan signal S(n+1) has a low voltage level, the compensation signal CMP has a high voltage level, and the interrupt signal XON has a low voltage level.

At this time, the multiplexer MX of the sub-shift register unit 304_R outputs the compensation signal CMP with the high voltage level to serve as the multiplexer output signal MX_R according to the sub-scan signal Q_R with the high voltage level. The OR gate OR of the sub-shift register unit 304_R outputs the control signal E_R with a high voltage level according to the multiplexer output signal MX_R with the high voltage level and the interrupt signal XON with the low voltage level. The NOR gate NR of the sub-shift register unit 304_R outputs the control signal S_R with a low voltage level according to the sub-scan signal Q_R with the high voltage level and the interrupt signal XON with the low voltage level.

The transistor T2 of the driving circuit 208_R turns off according to the control signal E_R with the high voltage level. The transistor T3 of the driving circuit 208_R turns on according to the control signal S_R with the low voltage level. At this time, the threshold voltage of the transistor T1 of the driving circuit 208_R is recorded in the capacitor C1 of the driving circuit 208_R.

Subsequently, during time points v5-v6, the previous-stage scan signal S(n) has a low voltage level, the sub-scan signal Q_R has a high voltage level, the sub-scan signal Q_G has a low voltage level, the sub-scan signal Q_B has a low voltage level, the current-stage scan signal S(n+1) has a low voltage level, the compensation signal CMP has a high voltage level, and the interrupt signal XON has a low voltage level.

At this time, the multiplexer MX of the sub-shift register unit 304_R outputs the compensation signal CMP with the high voltage level to serve as the multiplexer output signal MX_R according to the sub-scan signal Q_R with the high voltage level. The OR gate OR of the sub-shift register unit 304_R outputs the control signal E_R with a high voltage level according to the multiplexer output signal MX_R with the high voltage level and the interrupt signal XON with the low voltage level. The NOR gate NR of the sub-shift register unit 304_R outputs the control signal S_R with a low voltage level according to the sub-scan signal Q_R with the high voltage level and the interrupt signal XON with the low voltage level.

The transistor T2 of the driving circuit 208_R turns off according to the control signal E_R with the high voltage level. The transistor T3 of the driving circuit 208_R turns on according to the control signal S_R with the low voltage level, such that the data signal VDATA can be written into the capacitor C2 of the driving circuit 208_R.

Subsequently, during time points v6-v9, the previous-stage scan signal S(n) has a low voltage level, the sub-scan signal Q_R has a low voltage level, the sub-scan signal Q_G has a high voltage level, the sub-scan signal Q_B has a low voltage level, the current-stage scan signal S(n+1) has a low voltage level, and the interrupt signal XON has a low voltage level.

At this time, the multiplexer MX of the sub-shift register unit 304_R outputs the clock signal CLK to serve as the multiplexer output signal MX_R according to the sub-scan signal Q_R with the low voltage level. The OR gate OR of the sub-shift register unit 304_R outputs the control signal E_R with a waveform identical to the waveform of the clock signal CLK according to the multiplexer output signal MX_R and the interrupt signal XON with the low voltage level. The NOR gate NR of the sub-shift register unit 304_R outputs the control signal S_R with a high voltage level according to the sub-scan signal Q_R with the low voltage level and the interrupt signal XON with the low voltage level.

The transistor T3 of the driving circuit 208_R turns off according to the control signal S_R with the high voltage level. The transistor T2 of the driving circuit 208_R operatively conducts the supply voltage level OVDD to the second end of the transistor T1 of the driving circuit 208_R according to the control signal E_R with the waveform identical to the waveform of the clock signal CLK. In such a manner, the transistor T1 of the driving circuit 208_R can operatively generate the driving current ID_R corresponding to the control signal E_R according to the difference (i.e., a voltage difference between two ends of the capacitor C2 of the driving circuit 208_R) between the voltage levels on its second end (source end) and gate end, to drive the corresponding display unit LD_R.

It is noted that, although the operations of the elements inside the sub-shift register units 304_G, 304_B and the driving circuits 208_G, 208_B lag behind the operations of the elements inside the sub-shift register unit 304_R and the driving circuit 208_R for one or two cycle period(s) of the clock signal CLK, the operations of the elements inside the sub-shift register units 304_G, 304_B and the driving circuits 208_G, 208_B are substantially the same as the operations of the elements inside the sub-shift register unit 304_R and the driving circuit 208_R. Thus, a description of many aspects that are similar will not be repeated.

Through the configuration described above, the luminance of the display device 200 can be modulated by adjusting the cycle period of the clock signal CLK. That is, in each cycle period of the clock signal CLK, the durations in which the driving circuits 208_R, 208_G, 208_B drive the display units LD_R, LD_G, LD_B correspond to the duty cycle of the clock signal CLK (e.g., the duty cycles of the driving currents ID_R, ID_G, ID_B are substantially identical to the duty cycle of the clock signal CLK).

In addition, it is noted that the operations in connection with the interrupt signal XON can be ascertained by referring to the embodiment described above, and a description in this regard will not be repeated herein.

Through application of the embodiment described above, a scan circuit can be integrated into the ICs. With such a configuration, the non-active area can be significantly shrunk since it is not necessary to dispose the scan circuit therein.

Although the present disclosure has been described in considerable detail with reference to certain embodiments thereof, other embodiments are possible. Therefore, the scope of the appended claims is not limited to the description of the embodiments contained herein.

What is claimed is:

1. A display device comprising:

a substrate comprising an active area and a non-active area, wherein the non-active area is located around the active area;

a plurality of display units disposed in the active area of the substrate and arranged in a matrix; and a plurality of integrated circuits disposed in the active area of the substrate, arranged in a matrix, and electrically coupled to the display units, wherein each of the integrated circuits comprises a shift register unit, each of the shift register units of the integrated circuits is configured to receive a previous-stage scan signal, and generate a current-stage scan signal according to the previous-stage scan signal, and the integrated circuits drive the display units according to the current-stage scan signals;

wherein each of the integrated circuits corresponds to N corresponding display units among the display units, N is an integer greater than 1, and each of the shift register units of the integrated circuits comprises:

a plurality of sub-shift register units electrically coupled in series, wherein the sub-shift register units are denoted as $1^{st}$ to $N^{th}$ sub-shift register units, each of the sub-shift register units is configured to delay a previous-stage sub-scan signal to generate a current-stage sub-scan signal, the $1^{st}$ sub-shift register unit uses the previous-stage scan signal as its previous-stage sub-scan signal, each of the $1^{st}$ to $(N-1)^{th}$ sub-shift register units transmits the current-stage sub-scan signal to a next sub-shift register unit to serve as the previous-stage sub-scan signal of the next sub-shift register unit, the current-stage sub-scan signal of the $N^{th}$ sub-shift register unit serves as the current-stage scan signal, and each of the sub-shift register units is configured to generate at least one control signal according to the current-stage sub-scan signal; and N driving circuits, wherein the driving circuits are configured to drive the corresponding display units according to the control signals.

2. The display device as claimed in claim 1 further comprising:

a plurality of scan signal transmission lines disposed on the substrate and electrically coupled between the integrated circuits, wherein the scan signal transmission lines are configured to transmit a plurality of scan signals from a first portion of the integrated circuits arranged along a first direction to a second portion of the integrated circuits arranged along the first direction.

3. The display device as claimed in claim 1 further comprising:

a plurality of data lines disposed on the substrate, wherein the data lines are parallel to each other, and a third portion of the integrated circuits arranged along a second direction are electrically coupled to one of the data lines.

4. The display device as claimed in claim 1, wherein each of the shift register units of the integrated circuits is configured to receive the previous-stage scan signal, delay the previous-stage scan signal to generate the current-stage scan signal, and generate at least one control signal according to the current-stage scan signal; and each of the integrated circuits further comprises:

a driving circuit configured to drive a first driving unit among the driving units according to the at least one control signal.

5. The display device as claimed in claim 4, wherein each of the driving circuit comprises:

a driving transistor configured to generate a driving current flowing through the first driving unit according to a difference between voltage level on a source end and a gate end of the driving transistor.

6. The display device as claimed in claim 4, wherein each of the shift register units comprises:

a latch configured to receive the previous-stage scan signal, and delay the previous-stage scan signal to generate the current-stage scan signal;

an AND gate configured to perform a logical conjunction on an emitting signal and the current-stage scan signal, so as to generate an AND gate output signal;

an OR gate configured to receive an interrupt signal and the AND gate output signal, and accordingly generate a first control signal among the at least one control signal; and a NOR gate configured to receive the interrupt signal and the current-stage scan signal, and accordingly generate a second control signal among the at least one control signal.

7. The display device as claimed in claim 4 further comprising:

a plurality of bonding pad sets disposed on the substrate and arranged in a matrix, wherein the integrated circuits are bonded on the bonding pad sets respectively, and each of the bonding pad sets comprises a bonding pad electrically coupled to at least one of the display units among the plurality of display units.

8. The display device as claimed in claim 7, wherein the integrated circuits and the display units are disposed on a same surface of the substrate.

9. The display device as claimed in claim 1, wherein the sub-shift register units subsequently generate the control signals, so as to make the driving circuit subsequently drive the corresponding display units according to the control signals.

10. The display device as claimed in claim 1, wherein each of the sub-shift register units comprises:

a latch configured to receive the previous-stage sub-scan signal and a clock signal, and delay the previous-stage sub-scan signal according to the clock signal to generate the current-stage sub-scan signal;

a multiplexer electrically coupled to the latch, configured to receive the clock signal, a compensation signal, and the current-stage sub-scan signal, and selectively output one of the compensation signal and clock signal according to the current-stage sub-scan signal, so as to generate a multiplexer output signal;

an OR gate electrically coupled to the multiplexer, configured to receive an interrupt signal and the multiplexer output signal, and accordingly generate a first control signal among the control signals; and a NOR gate configured to receive the interrupt signal and the current-stage sub-scan signal, and accordingly generate a second control signal among the control signals;

wherein lengths of time periods when the driving circuits drive the corresponding display units correspond to a duty cycle of the clock signal.

11. The display device as claimed in claim 10 further comprising:

a plurality of bonding pad sets disposed on the substrate and arranged in a matrix, wherein the integrated circuits are bonded on the bonding pad sets respectively, and each of the bonding pad sets comprises a bonding pad electrically coupled to at least one of the display units among the plurality of display units.

12. The display device as claimed in claim 10, wherein the integrated circuits and the display units are disposed on a same surface of the substrate.

13. The display device as claimed in claim 1 further comprising:

a plurality of bonding pad sets disposed on the substrate and arranged in a matrix, wherein the integrated circuits are bonded on the bonding pad sets respectively, and each of the bonding pad sets comprises a bonding pad electrically coupled to at least one of the display units among the plurality of display units.

14. The display device as claimed in claim 1, wherein the integrated circuits and the display units are disposed on a same surface of the substrate.

15. A display device comprising:

a substrate comprising an active area and a non-active area, wherein the non-active area is located around the active area;

a plurality of display units disposed in the active area of the substrate and arranged in a matrix; and a plurality of integrated circuits disposed in the active area of the substrate, arranged in a matrix, and electrically coupled to the display units, wherein each of the integrated circuits comprises a shift register unit, each of the shift register units of the integrated circuits is configured to receive a previous-stage scan signal, and generate a current-stage scan signal according to the previous-stage scan signal, and the integrated circuits drive the display units according to the current-stage scan signals;

wherein each of the shift register units of the integrated circuits is configured to receive the previous-stage scan signal, delay the previous-stage scan signal to generate the current-stage scan signal, and generate at least one control signal according to the current-stage scan signal; and each of the integrated circuits further comprises:

a driving circuit configured to drive a first driving unit among the driving units according to the at least one control signal;

wherein each of the shift register units comprises:

a latch configured to receive the previous-stage scan signal, and delay the previous-stage scan signal to generate the current-stage scan signal;

an AND gate configured to perform a logical conjunction on an emitting signal and the current-stage scan signal, so as to generate an AND gate output signal;

an OR gate configured to receive an interrupt signal and the AND gate output signal, and accordingly generate a first control signal among the at least one control signal; and a NOR gate configured to receive the interrupt signal and the current-stage scan signal, and accordingly generate a second control signal among the at least one control signal.

* * * * *